No. 766,330. PATENTED AUG. 2, 1904.
E. O. DOAK.
FLEXIBLE METAL BAND FOR TRACTION WHEELS.
APPLICATION FILED MAY 6, 1904.
NO MODEL. 2 SHEETS—SHEET 1.
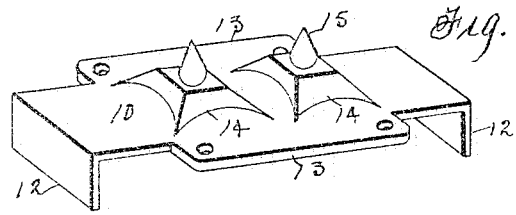
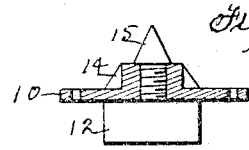
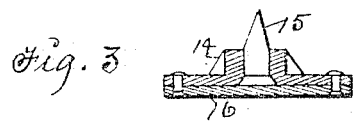
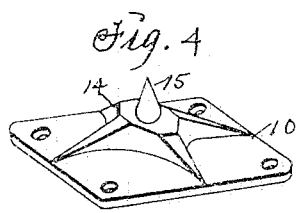
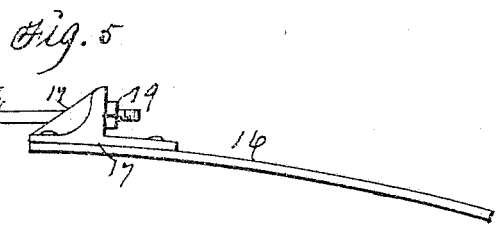
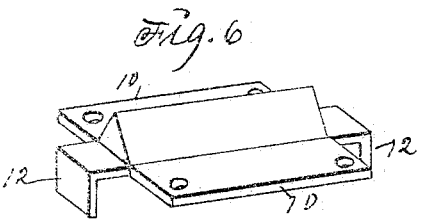
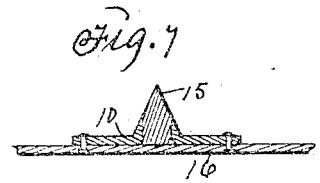
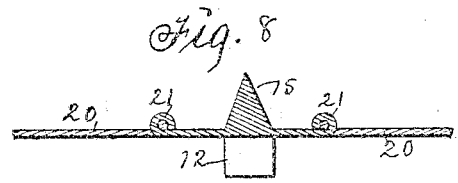
Witnesses:
R. L. Reibrock
R. H. Orwig
Inventor: Egbert O. Doak,
By Thomas G. Orwig, Attorney.

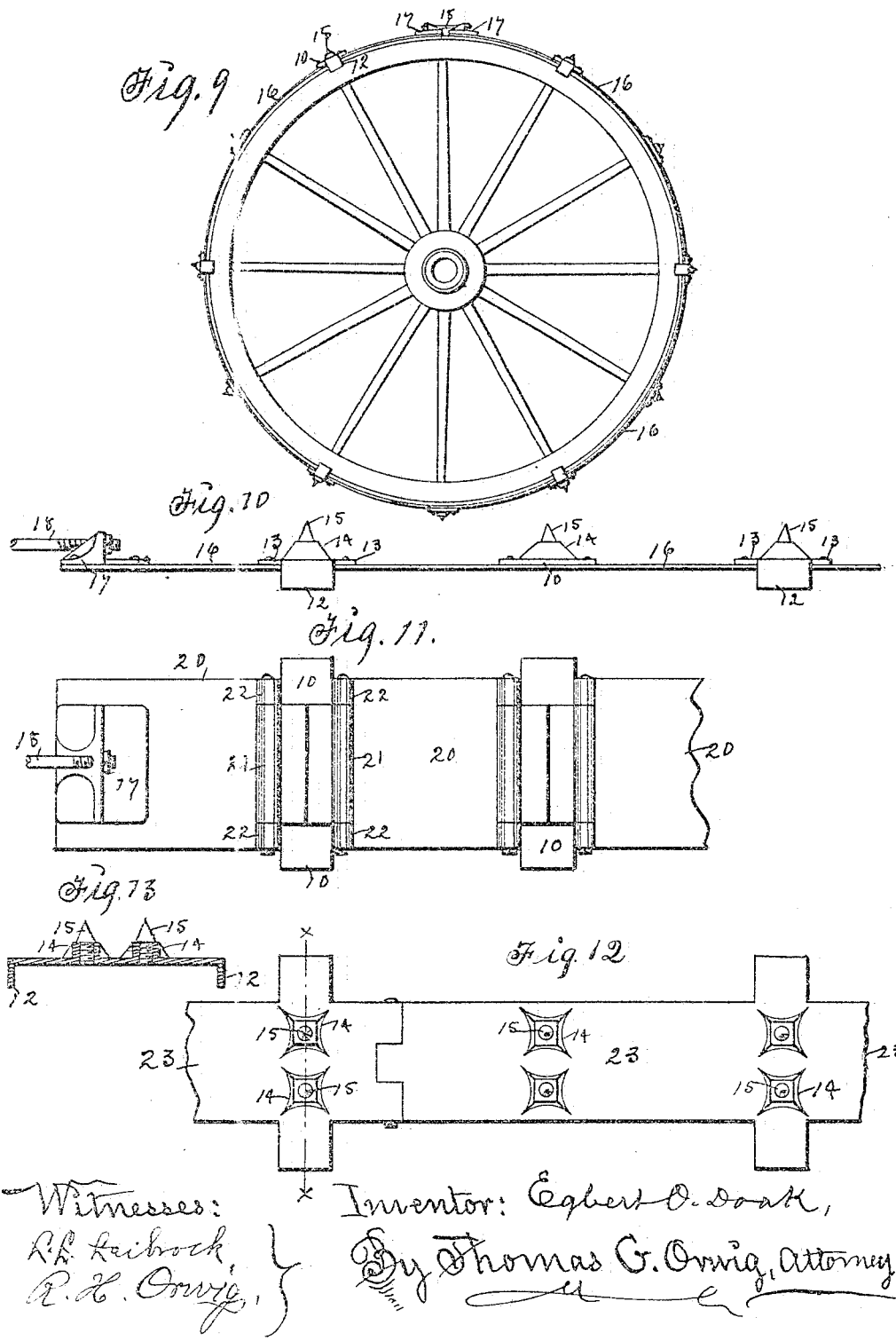

No. 766,330.　　　　　　　　　　　　　　　　　　Patented August 2, 1904.

UNITED STATES PATENT OFFICE.

EGBERT O. DOAK, OF SAC CITY, IOWA.

FLEXIBLE METAL BAND FOR TRACTION-WHEELS.

SPECIFICATION forming part of Letters Patent No. 766,330, dated August 2, 1904.

Application filed May 6, 1904. Serial No. 206,770. (No model.)

*To all whom it may concern:*

Be it known that I, EGBERT O. DOAK, a citizen of the United States, residing at Sac City, in the county of Sac and State of Iowa, have invented a New and Useful Flexible Metal Band for Traction-Wheels of Manure-Spreaders, of which the following is a specification.

My object is to provide a band adapted to be detachably placed on the carriage-wheel of a manure-spreader, traction-engine, or any traction-wheel in any form of vehicle for the purpose of increasing friction on the ground or road whereon the vehicle is advanced, for transmitting power from the wheel to machinery combined with the vehicle, or for preventing a traction-wheel from slipping on its track.

My invention consists in the construction, arrangement, and combination of parts, as hereinafter set forth, pointed out in my claims, and illustrated in the accompanying drawings, in which—

Figure 1 is a perspective view of a flanged metal plate adapted to be fixed on the fixed tire of a wagon or carriage wheel and also adapted to be fixed on a band adapted to be detachably placed on the fixed tire of a wheel. Fig. 2 is a transverse section of the plate that shows how steel calks are fixed to the plate by means of screw-threads. Fig. 3 is a modification of Fig. 2 and shows a calk provided with a head for fastening it to the plate. Fig. 4 is a modification of Fig. 1 and shows a plate without flanges and with only one calk fixed thereto. Fig. 5 shows two plates fixed to the ends of a metal band to detachably connect the ends of a flexible band as required in detachably fixing the band on a wheel. Fig. 6 is a modification of Fig. 1 in which a single calk extends from one end portion of the plate to the other. Fig. 7 is a transverse sectional view of Fig. 6 and shows it fixed to a section of a flexible band. Fig. 8 shows one of the plates having a calk connected with band-sections by means of hinge-joints. Fig. 9 shows my flexible metal band applied to a wheel as required for practical use. Fig. 10 shows a section of the flexible band and a plate fixed on its end adapted for receiving a bolt as required for detachably and adjustably connecting the ends of the flexible band. Fig. 11 is a top view of a band composed of plates having calks and band-sections hinged together. Fig. 12 is a top view of sections of a band hinged together and provided with integral extensions and calks in alinement with said extensions. Fig. 13 is a transverse sectional view on the line *x x* of Fig. 12.

The numeral 10 designates a flat-bottomed metal plate, preferably steel, that may vary in size as desired and as required to be fixed to flat-surfaced metal bands of different width. It has integral flanges 12 at its ends adapted to slide over the edges of a fixed tire on a traction-wheel. It also has lateral extensions 13 at its sides, that are provided with perforations to admit rivets for fixing the plate on a metal band. It also has enlargements 14 on its top provided with holes for the admission of calks 15, as shown in Figs. 2 and 3. It is obvious for a narrow band only one calk is required, as shown in Fig. 4, and that the flanges at the ends of the plate may be dispensed with.

A metal band 16 can be detachably and adjustably connected at its ends by means of a plate 17, fixed on the ends, and a screw-bolt 18 and nuts 19, as shown in Fig. 5. The plates provided with calks may be fixed on top of a metal band 16, as shown in Figs. 7 and 10, or they may be hinged to sections 20 of a band, as shown in Figs. 8, 11, and 12, to produce a complete flexible band by means of knuckles 21 integral with the plates and knuckles 22 integral with the band-sections 20', or the plates 10 may have integral extensions 23, as shown in Fig. 12, to serve as band-sections for making a complete flexible band adapted to be fixed on a wheel by means of plates 17 at its ends and a screw-bolt and nuts in the same manner as shown in Fig. 5.

Having thus set forth the purpose of my invention and the manner of its construction and application, its practical operation and utility will be readily understood by persons familiar with the art to which it pertains; and

What I claim as new, and desire to secure by Letters Patent, is—

1. In a flexible band for traction-wheels, a flat-bottomed metal plate adapted to be fixed on a band and provided with a detachable calk extending outward, as shown and described for the purposes stated.

2. A flat-bottomed plate, adapted to be fixed to a flexible metal band, provided with flanges at its ends and a detachable calk projecting outward, for the purposes stated.

3. A plate, adapted to be fixed to a flat flexible metal band, provided with lateral perforated extensions and a detachable calk projecting outward, as and for the purposes stated.

4. A flat-bottomed plate, adapted to be fixed to a flat-surfaced metal band, provided with an enlargement on its top and an aperture through the enlargement and a calk fixed in the aperture, for the purposes stated.

5. A flexible metal band, comprising a plurality of flat-bottomed metal plates connected with the band at spaces along the length of the band and provided with detachable outwardly-extending calks and means for detachably connecting the ends of the band.

6. A flexible metal band composed of sections having detachable calks projecting outward therefrom and metal plates fixed to the ends of the band and provided with upward perforated extensions to admit a screw-bolt and nuts on the ends of the bolts, for the purposes stated.

7. A friction-band for a traction-wheel comprising a flexible metal band, a plurality of metal plates connected with the band at distances apart along the length of the band, detachable calks projecting outward from the plates, metal plates fixed to the ends of the band and provided with bolt-holes, a bolt extended through said bolt-holes and nuts on the ends of the bolts, for the purposes stated.

8. A friction-band for a traction-wheel comprising a flexible metal band, a plurality of metal plates connected with the band at distances apart along the length of the band, detachable calks projecting outward from the plates, metal plates fixed to the ends of the band and provided with bolt-holes, a bolt extended through said bolt-holes and nuts on the ends of the bolt, in combination with a traction-wheel, to operate in the manner set forth, for the purposes stated.

EGBERT O. DOAK.

Witnesses:
GEO. B. PERKINS,
E. N. BAILY.